US008171101B2

(12) United States Patent
Gladwin et al.

(10) Patent No.: US 8,171,101 B2
(45) Date of Patent: *May 1, 2012

(54) SMART ACCESS TO A DISPERSED DATA STORAGE NETWORK

(75) Inventors: S. Christopher Gladwin, Chicago, IL (US); Greg Dhuse, Chicago, IL (US); Vance Thornton, Chicago, IL (US); Ilya Volvovski, Chicago, IL (US); Jamie Bellanca, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 263 days.

This patent is subject to a terminal disclaimer.

(21) Appl. No.: 11/973,622

(22) Filed: Oct. 9, 2007

(65) Prior Publication Data

US 2009/0094318 A1    Apr. 9, 2009

Related U.S. Application Data

(63) Continuation-in-part of application No. 11/241,555, filed on Sep. 30, 2005, now Pat. No. 7,953,937.

(51) Int. Cl.
*G06F 15/167* (2006.01)

(52) U.S. Cl. ........ 709/216; 709/214; 709/215; 709/219; 370/242; 370/254; 714/15; 714/47.2

(58) Field of Classification Search ........... 709/213–216
See application file for complete search history.

(56) References Cited

U.S. PATENT DOCUMENTS

| | | | |
|---|---|---|---|
| 4,092,732 A | 5/1978 | Ouchi | |
| 5,485,474 A | 1/1996 | Rabin | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |

(Continued)

OTHER PUBLICATIONS

Chung, "An Automatic Data Segmentation Method for 3D Measured Data Points," National Taiwan University, 1998, pp. 1-8.

(Continued)

*Primary Examiner* — Quang N. Nguyen
*Assistant Examiner* — Razu Miah
(74) *Attorney, Agent, or Firm* — Garlick & Markison; Timothy W. Markison (57) ABSTRACT

An improved system for accessing data within a distributed data storage network ("DDSN") is disclosed. In a system implementing the disclosed invention, traffic is routed to individual slice servers within the DDSN in accordance with objective criteria as well as user-defined policies. In accordance with one aspect of the disclosed invention, when a data segment is written to a DDSN, the segment is divided into multiple data slices, which are simultaneously transmitted to different slice servers. In accordance with another aspect of the disclosed invention, when a data segment is read from a DDSN, a list of slice servers, each containing a data slice that could be used to reconstruct the requested data segment, is assembled, and sorted in accordance with a preference rating assigned to each of the slice servers. Sufficient data slices to reconstruct the data segment are then read in accordance with the preference ranking of the slice servers.

12 Claims, 5 Drawing Sheets

U.S. PATENT DOCUMENTS

| | | | |
|---|---|---|---|
| 6,298,382 B1 * | 10/2001 | Doi et al. | 709/229 |
| 6,301,604 B1 * | 10/2001 | Nojima | 718/108 |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 * | 5/2003 | Bowman-Amuah | 709/219 |
| 6,609,223 B1 | 8/2003 | Wolfgang | |
| 6,714,980 B1 * | 3/2004 | Markson et al. | 709/226 |
| 6,760,808 B2 | 7/2004 | Peters et al. | |
| 6,785,768 B2 | 8/2004 | Peters et al. | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,609 B2 | 4/2006 | Wolfgang et al. | |
| 7,093,098 B2 * | 8/2006 | Klein et al. | 711/173 |
| 7,103,824 B2 * | 9/2006 | Halford | 714/759 |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,240,236 B2 | 7/2007 | Cutts et al. | |
| 7,467,329 B1 * | 12/2008 | Keeton et al. | 714/15 |
| 7,536,585 B1 * | 5/2009 | Keeton et al. | 714/47.2 |
| 7,644,046 B1 * | 1/2010 | Keeton et al. | 705/400 |
| 2002/0166079 A1 | 11/2002 | Ulrich et al. | |
| 2003/0018927 A1 * | 1/2003 | Gadir et al. | 714/4 |
| 2003/0084020 A1 | 5/2003 | Shu | |
| 2004/0010666 A1 * | 1/2004 | Umbehocker et al. | 711/156 |
| 2004/0024963 A1 | 2/2004 | Talagala et al. | |
| 2005/0114594 A1 | 5/2005 | Corbett et al. | |
| 2005/0125593 A1 | 6/2005 | Karpoff et al. | |
| 2005/0144382 A1 | 6/2005 | Schmisseur | |
| 2006/0047907 A1 | 3/2006 | Shiga et al. | |
| 2006/0224560 A1 * | 10/2006 | Makita | 707/1 |
| 2007/0079081 A1 * | 4/2007 | Gladwin et al. | 711/154 |
| 2007/0079082 A1 | 4/2007 | Gladwin et al. | |
| 2007/0079083 A1 | 4/2007 | Gladwin et al. | |
| 2007/0174192 A1 * | 7/2007 | Gladwin et al. | 705/40 |
| 2007/0214255 A1 * | 9/2007 | Spitz et al. | 709/224 |
| 2007/0214285 A1 * | 9/2007 | Au et al. | 709/246 |
| 2008/0015958 A1 * | 1/2008 | Vanker et al. | 705/28 |
| 2008/0147821 A1 * | 6/2008 | Dietrich et al. | 709/216 |

OTHER PUBLICATIONS

Copenheaver, International Search Report and Written Opinion of the International Searching Authority for PCT/US 2008/077171, Dec. 3, 2008.

Shamir, "How to Share a Secret" Communications of the ACM, vol. 22, No. 11, Nov. 1979.

Rabin, "Efficient Dispersal of Information for Security, Load Balancing, and Fault Tolerance" Journal of the Association for Computer Machinery, vol. 36, No. 2, Apr. 1989.

* cited by examiner

Smart Access - Reading

| | Ping Time | Historical Response Time | Load % | Composite Score |
|---|---|---|---|---|
| Slice Server 1 | 61ms | 62ms | 0.36 | 33.24 |
| Slice Server 2 | 132ms | 137ms | 0.71 | 17.83 |
| Slice Server 3 | 174ms | 29ms | 0.99 | 43.03 |
| Slice Server 4 | 33ms | 74ms | 0.68 | 45.21 |
| Slice Server 5 | 27ms | 29ms | 0.21 | 73.90 |

Composite Score = $A/T_p + B/T_h + C/L$

SMART ACCESS TO A DISPERSED DATA STORAGE NETWORK

CROSS REFERENCE TO RELATED PATENTS/PATENT APPLICATIONS

The present U.S. Utility patent application claims priority pursuant to 35 U.S.C. §120, as a continuation-in-part (CIP), to U.S. Utility patent application having a Ser. No. 11/241,555, entitled "System, methods, and apparatus for subdividing data for storage in a dispersed data storage grid," and a filing date of Sep. 30, 2005 now U.S. Pat. No. 7,953,937.

FIELD OF THE INVENTION

The present invention relates generally to systems, apparatus, and methods for distributed data storage, and more particularly to systems, apparatus, and methods for distributed data storage using an information dispersal algorithm so that no one location will store an entire copy of stored data, and more particularly still to systems, apparatus, and methods for accessing a dispersed data storage network.

DESCRIPTION OF THE PRIOR ART

Storing data in digital form is a well-known problem associated with all computer systems, and numerous solutions to this problem are known in the art. The simplest solution involves merely storing digital data in a single location, such as a punch film, hard drive, or FLASH memory device. However, storage of data in a single location is inherently unreliable. The device storing the data can malfunction or be destroyed through natural disasters, such as a flood, or through a malicious act, such as arson. In addition, digital data is generally stored in a usable file, such as a document that can be opened with the appropriate word processing software, or a financial ledger that can be opened with the appropriate spreadsheet software. Storing an entire usable file in a single location is also inherently insecure as a malicious hacker only need compromise that one location to obtain access to the usable file.

To address reliability concerns, digital data is often "backed-up," i.e., an additional copy of the digital data is made and maintained in a separate physical location. For example, a backup tape of all network drives may be made by a small office and maintained at the home of a trusted employee. When a backup of digital data exists, the destruction of either the original device holding the digital data or the backup will not compromise the digital data. However, the existence of the backup exacerbates the security problem, as a malicious hacker can choose between two locations from which to obtain the digital data. Further, the site where the backup is stored may be far less secure than the original location of the digital data, such as in the case when an employee stores the tape in her home.

Another method used to address reliability and performance concerns is the use of a Redundant Array of Independent Drives ("RAID"). RAID refers to a collection of data storage schemes that divide and replicate data among multiple storage units. Different configurations of RAID provide increased performance, improved reliability, or both increased performance and improved reliability. In certain configurations of RAID, when digital data is stored, it is split into multiple units, referred to as "stripes," each of which is stored on a separate drive. Data striping is performed in an algorithmically certain way so that the data can be reconstructed. While certain RAID configurations can improve reliability, RAID does nothing to address security concerns associated with digital data storage.

One method that prior art solutions have addressed security concerns is through the use of encryption. Encrypted data is mathematically coded so that only users with access to a certain key can decrypt and use the data. Common forms of encryption include DES, AES, RSA, and others. While modern encryption methods are difficult to break, numerous instances of successful attacks are known, some of which have resulted in valuable data being compromised.

In 1979, two researchers independently developed a method for splitting data among multiple recipients called "secret sharing." One of the characteristics of secret sharing is that a piece of data may be split among n recipients, but cannot be known unless at least t recipients share their data, where $n \geq t$. For example, a trivial form of secret sharing can be implemented by assigning a single random byte to every recipient but one, who would receive the actual data byte after it had been bitwise exclusive orred with the random bytes. In other words, for a group of four recipients, three of the recipients would be given random bytes, and the fourth would be given a byte calculated by the following formula:

$$s' = s \oplus r_a \oplus r_b \oplus r_c,$$

where s is the original source data, $r_a$, $r_b$, and $r_c$ are random bytes given to three of the four recipients, and s' is the encoded byte given to the fourth recipient. The original byte s can be recovered by bitwise exclusive-orring all four bytes together.

The problem of reconstructing data stored on a digital medium that is subject to damage has also been addressed in the prior art. In particular, Reed-Solomon and Cauchy Reed-Solomon coding are two well-known methods of dividing encoded information into multiple slices so that the original information can be reassembled even if all of the slices are not available. Reed-Solomon coding, Cauchy Reed-Solomon coding, and other data coding techniques are described in "Erasure Codes for Storage Applications," by Dr. James S. Plank, which is hereby incorporated by reference.

Schemes for implementing dispersed data storage networks ("DDSN"), which are also known as dispersed data storage grids, are also known in the art. In particular, U.S. Pat. No. 5,485,474, issued to Michael O. Rabin, describes a system for splitting a segment of digital information into n data slices, which are stored in separate devices. When the data segment must be retrieved, only m of the original data slices are required to reconstruct the data segment, where n>m.

Nonetheless, DDSN technology has not achieved widespread acceptance or use. One important problem involved in the implementation of DDSNs is how to effectively manage a network of dispersed storage servers, hereinafter referred to as slice servers. For example, when a block of data is read from a dispersed data storage network, 20 or more data slices may be required to reconstruct the data block. Each of the data slices must be read from separate slice servers, which have differing performance and load characteristics. Factors affecting slice server performance include, but are not limited to increased load, hardware and/or software failures on the slice servers, and damage to network infrastructure.

In many circumstances, a particular user of a dispersed data storage network may not want to use a slice server to store data even though, based on objective criteria, the slice server in question performs well. For example, a government entity may insist that all slice servers storing that entity's data are located within territory that the government is sovereign over.

OBJECTS OF THE INVENTION

Accordingly, it is an object of this invention to provide a system, apparatus, and method for effectively accessing a network of slice servers within a dispersed data storage network.

Another object of this invention is to provide a dispersed data storage network that intelligently handles network outages affecting at least some number of slice servers on the network.

Another object of this invention is to provide a system, apparatus, and method for objectively ranking slice servers by their performance.

Another object of this invention is to provide a user configurable system for selecting from a set of slice servers the specific slice servers that will be used to fulfill an operation.

Another object of this invention is to provide an improved method of reading data from a dispersed data storage network.

Another object of this invention is to provide an improved method of writing data to a dispersed data storage network.

SUMMARY OF THE INVENTION

The disclosed invention achieves its objectives by providing an improved method for accessing dispersed data storage networks. A DDSN using the disclosed system will improve network performance by routing traffic to the best performing slice servers within the DDSN. Further, a user's specific routing preferences can be accommodated by routing traffic within the DDSN in accordance with user selected policies. For example, where network access costs for different slice servers are different, traffic can be preferentially routed to the slice server with lower cost network access.

In one aspect of the disclosed invention, an improved method of reading data from a dispersed data storage network is disclosed. A read request for a specific data segment stored on the DDSN is received. In response to the read request, a list of slice servers holding data slices associated with the requested data segment is assembled. Each slice server is assigned a rating in accordance with performance characteristics of the slice server or in accordance with user selected policies. Using the assigned preference rating, a sufficient number of data slices are retrieved to assemble the requested data segment.

In another aspect of the disclosed invention, an improved method of writing data to a dispersed data storage network is disclosed. A write request is received, and dispersal parameters for the DDSN are accessed, including the number of slices that the segment is to be divided into, as well as the minimum number of slices that are required to reconstruct the data segment. A data dispersal algorithm is then applied to the data segment, which is divided into the appropriate number of data slices. The data slices are simultaneously transmitted to a plurality of slice servers so that each data slice is stored on a separate slice server. The process of storing the data slices is then monitored to ensure that at least a predetermined number of data slices is stored.

In yet another aspect of the disclosed invention, a distributed computer system implementing a dispersed data storage network is disclosed. The system includes a client computer, which originates a request for a specific data segment stored by the DDSN. The system also includes a plurality of slice servers that store and retrieve data slices in accordance with commands received from a grid access computer. The grid access computer receives the read request, and assembles a list of slice servers holding data slices that can be used to assemble the requested data segment. The grid access computer also assigns a preference ranking to each of the slice servers, and then retrieves sufficient data slices to assemble the requested data segment in accordance with the assigned preference rankings.

In still yet another aspect of the disclosed invention, a similar distributed computer system implementing a dispersed data storage network is disclosed. The system includes a client computer, which originates a write request to store a data segment within the DDSN. The system also includes a plurality of slice servers that store and retrieve data slices in accordance with commands received from a grid access computer. The grid access computer receives the write request and accesses dispersal parameters associated with the DDSN. The grid access computer then divides the data segment into an appropriate number of data slices, and simultaneously transmits the data slices to slice servers within the DDSN, so that each data slice is transmitted to a different slice server. The grid access computer also queries each of the slice servers to insure that at least a predetermined number of the transmitted data slices are successfully stored,

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE ILLUSTRATED EMBODIMENT

Figure 1:
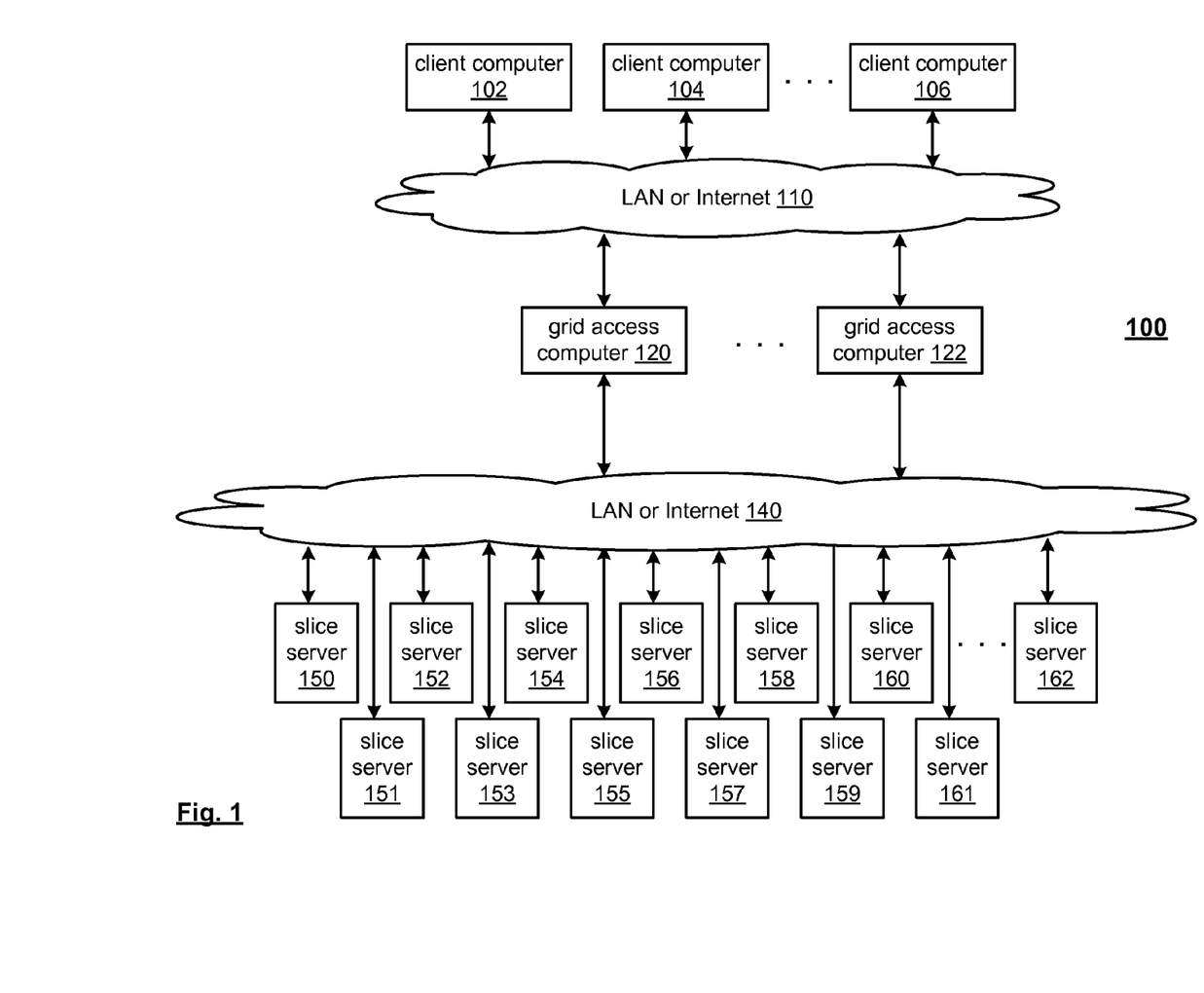
FIG. 1 is a network diagram of a dispersed data storage network constructed in accordance with an embodiment of the disclosed invention.

Turning to the Figures, and to FIG. 1 in particular, a distributed computer system implementing a dispersed data storage network 100 is shown. An arbitrary number of slice servers 150-162 store data slices sent to them by networked client computers 102,104,106. As illustrated, some number of grid access computers 120,122 allows access to the slice servers 150-162 by the client computers 102,104,106.

As explained herein, the disclosed invention allows a dispersed data storage network 100 to be more effectively accessed by client computers 102,104,106. In accordance with the disclosed invention, access to a collection of slice servers 150-162 can be optimized through the use of objective criteria to obtain a preference rating for each slice server. Each slice server 150-162 will have individual performance related characteristics. For example, a particular slice server 150 may comprise a sophisticated multi-core state of the art CPU as well as a state of the art SAN with extremely fast and responsive drives, and a fast, reliable connection to the Internet. A second slice server 157 may comprise an older, slower CPU, outdated, slow and limited storage, and a modest and unreliable connection to the Internet. All else being equal, the performance of a dispersed data storage network 100 would be substantially improved if operations were fulfilled by slice server 150 as opposed to slice server 157. Alternatively, the poor performance of a server can be minimized by accessing more servers than are required. For example, if a particular block of data to be read requires that three slices be retrieved to assemble the block, slices could be read simultaneously from five servers and the first three slices retrieved could be used to assemble the desired data block.

In the illustrated dispersed data storage network 100, client computers 102,104,106 read data from and write data to slice servers 150-162 through grid access computers 120,122. When a read or write is initiated, grid access computers 120,122 select appropriate slice servers 150-162 to fulfill the read or write. For example, a DDSN where data is split into four separate slices could be implemented by any four of the illustrated servers. Assuming that the information dispersal algorithm employed by the DDSN requires that three slices are required to reconstruct stored data, a grid access computer 120 retrieving a data segment for a client computer could use a number of different techniques. The simplest technique would be to simultaneously issue read requests for the appropriate data slice to all four slice servers holding relevant data, and then use the first three slices retrieved to reconstruct the requested data block. Alternatively, the grid access computer could rank the four slice servers holding relevant data slices using a group of performance criteria, and issue simultaneous requests only to the three highest ranked slice servers.

Network outages are a common occurrence for any network based system, and the disclosed invention provides an improved method for dealing with a network outage affecting at least part of a dispersed data storage network. In particular, where one or more slice servers within the dispersed data storage network are unavailable, then a system implementing the disclosed invention will make a determination whether a particular read or write operation can be completed. If a particular operation cannot be implemented, the requesting computer will be notified with an appropriate error message.

A DDSN is a distributed system with multiple layers. Generally, a client computer will make a request to a grid access computer, which will then direct appropriate commands to some number of slice servers. In such a situation, it is not always possible to return an intelligent error code. However, in the situations where it is possible to return a correct error code, good practices demand that such an error code be returned. For example, if a read operation fails because too many data slices have become corrupted to reconstruct the requested data segment, the client computer should be informed so that appropriate action can be taken.

Figure 2:
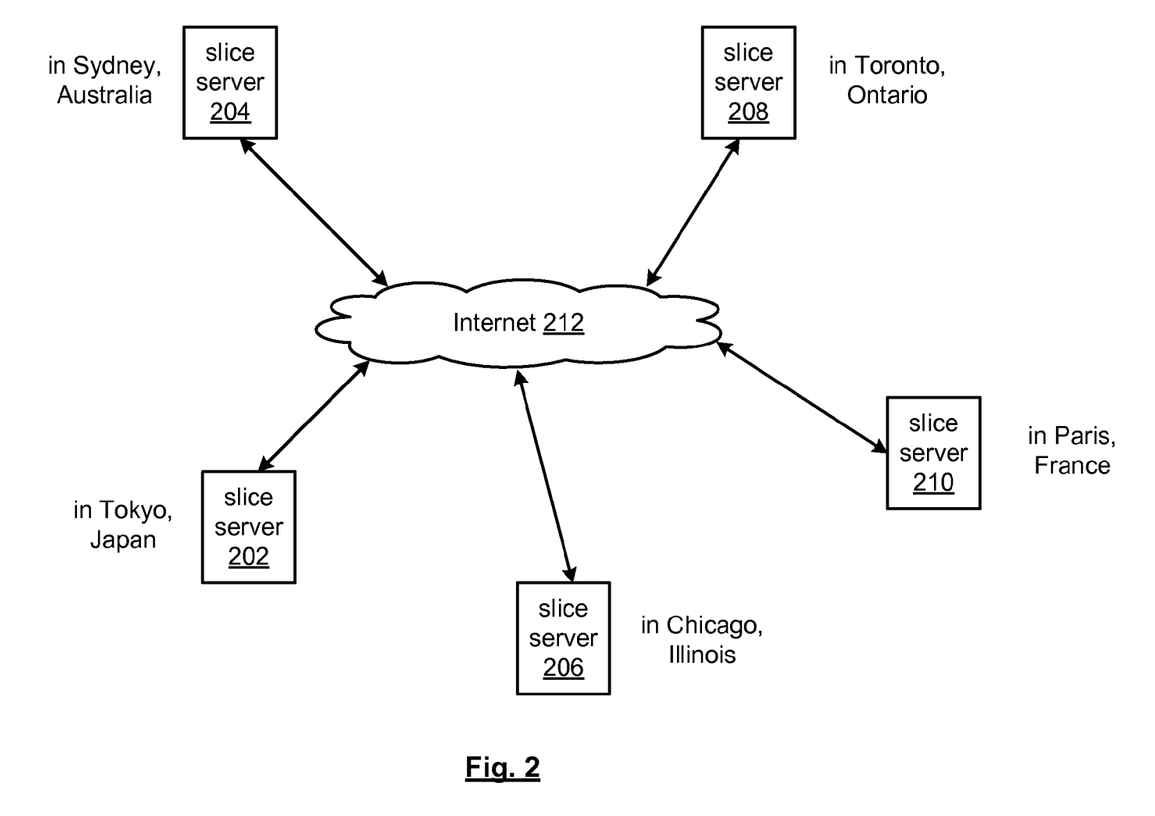
FIG. 2 is a network diagram illustrating five slice servers implementing part of a dispersed data storage network, where each slice server is located at a separate site, and has varying performance characteristics.

FIG. 2 is a network diagram depicting part of a DDSN. In particular, five slice servers located at different sites are shown. By example, the first slice server 202 could be located within Tokyo, Japan, and be implemented using mid-range hardware and with a mid-speed Internet connection. A second slice server 204 could be located in Sydney, Australia, and be implemented with high end hardware and a slow and/or overloaded connection to the Internet. A third slice server 206 could be located in Chicago, Ill., and be implemented with high end hardware and a fast connection to the Internet. A fourth slice server 208 could be located in Toronto, Ontario, and be implemented with mid-range hardware and a mid-speed connection to the Internet. Finally, a fifth slice server 210 could be located in Paris, France, and be implemented with high-end hardware and a fast connection to the Internet.

While hardware quality and connection speed are partially determinative of a slice server's performance, other factors are relevant as well. For example, the number of operations a particular slice server is presently handling can affect the ability of a slice server to quickly handle additional operations. This quantity is commonly characterized as "load %," i.e., the number of operations a slice server is presently handling divided by the maximum number of operations a slice server can concurrently service. Of course, a drive must have a sufficient amount of storage to store a particular data slice as well. Finally, the occurrence of an earthquake or other disaster, natural or otherwise, can adversely affect the performance of a slice server located nearby even if the slice server's other performance related characteristics appear acceptable. During and immediately after disasters, telephony networks tend to experience increased load, and more importantly, bursts of usage that could drown out access to a slice server.

Figure 3:
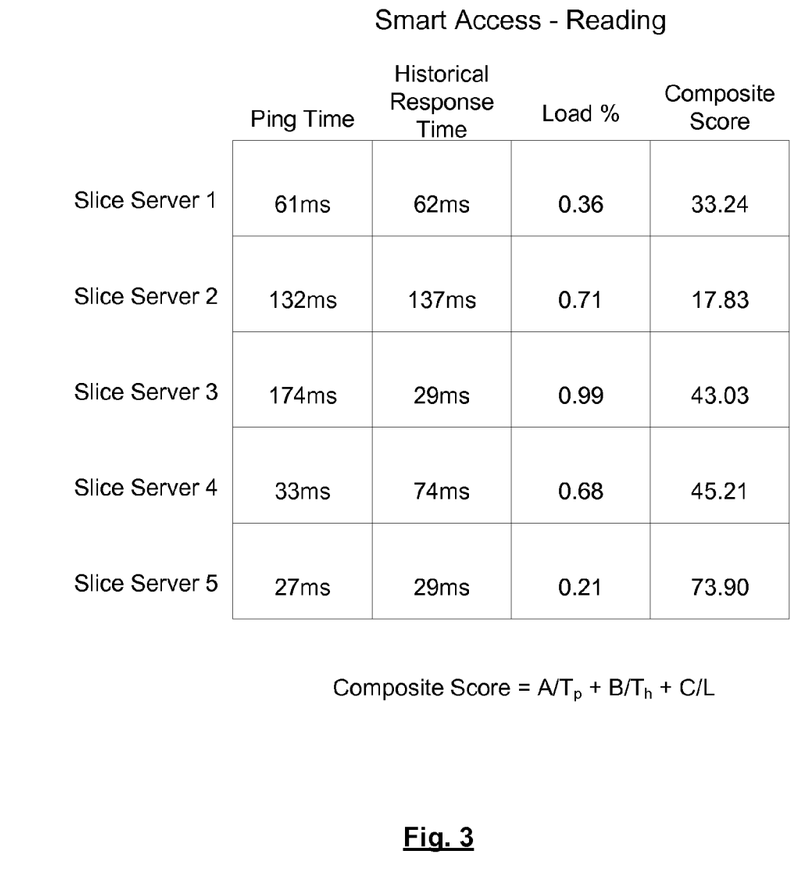
FIG. 3 is a table characterizing performance parameters of a number of slice servers.

FIG. 3 is a table summarizing some performance criteria collected from the group of five slice servers shown in FIG. 2. The first two columns, ping time, and historical responsiveness, are indicators of connection speed. Ping time refers to the time between which a "request" packet is issued to a slice server, and the time a "response" packet is received from the slice server. Generally, ping time will be measured periodically, such as every minute or every ten minutes. Historical responsiveness is an indication of how responsive a particular slice server has been historically; for example, a rolling average of ping time. Load % is, as discussed above, an indication of how many operations a particular server is handling as a percentage of its maximum capacity.

Each server also contains a "composite score," which is calculated using a formula such as the following:

$$\text{Score} = \frac{A}{T_P} + \frac{B}{T_H} + \frac{C}{L}$$

Where A, B, and C are constants, $T_P$ is a particular slice server's most recent ping time, $T_H$ is a particular slice server's historical response time, L is a particular slice servers load %, and S is a particular slice server's available storage %. For the figures contained in FIG. 3, A and B are both set to 1, while C is set to 2.

FIG. 3 illustrates one potential way that a preference rating could be developed for a network of slice servers. Other criteria could also be used; for example, certain data slices may require less processing to combine with other data slices dependent on the particular dispersal algorithm used, and therefore, those slices that are easier to combine with one another could be weighted higher than other data slices.

Assuming that a DDSN is implemented by the five servers of FIG. 2, and further assuming that while each data segment stored to the DDSN is segmented into five slices, but only three of those slices are required to reconstruct any data segment, the slice servers selected to service a read request could be based on the preference criteria of FIG. 3. For example, read requests could be issued to the three slice servers with the highest scores, i.e., slice server 5, slice server 4, and slice server 3. Alternatively, read requests could be issued to all five slice servers, and the first three data slices received could be used to reconstruct the requested data.

In addition to objective criteria, like that shown in FIG. 3 and discussed above, other criteria can be used to determine which servers will be used to fulfill given requests. These criteria take the form of policies. Policies can be based on territorial considerations, i.e., each slice server must be located in a separate state or country, or all slice servers must be located in a particular state or country. Policies can also be based on cost considerations, such as by adding an additional factor or factors to the composite score equation used above to rank slice servers by objective criteria. For example, if network usage for a particular slice server is more expensive generally, or if the cost of network usage varies based on time of day or other reasons, the composite score can be adjusted to make an affected slice server more or less desirable.

Policies could also be used to intelligently deal with network outages, and to optimize the tradeoff between how quickly a particular operation is completed and how many network resources a particular operation consumes. For example, if a certain number of slice servers are unavailable, those slice servers could be eliminated from consideration when attempting to assemble a list of servers containing relevant data slices. Further, if a certain number of slice servers should fail to provide a data slice during a read operation, those slice servers could be removed from consideration, and the remaining slice servers could be read. For example, a DDSN could operate where each segment is sliced into 128 data slices, 96 of which are required to reconstruct the data segment. In such a system, 104 slices could be initially read, theoretically providing 8 redundant slices if all reads were successful. Further, if only 91 of the slices are successfully read, a second read would be made to slice servers selected from the 24 that were not contacted during the first read. To improve the odds for success, 4 extra servers, e.g., 9 in total, could be read. Alternatively, a multiplier, such as 1.5, could be used to determine how many servers to use. In this case, 5 slices are required, so using a multiplier of 1.5 would cause 8 (7.5 rounded up) servers to be read. A person of ordinary skill in the art could, after examining the disclosure contained herein, devise numerous other useful policies.

Figure 4A:
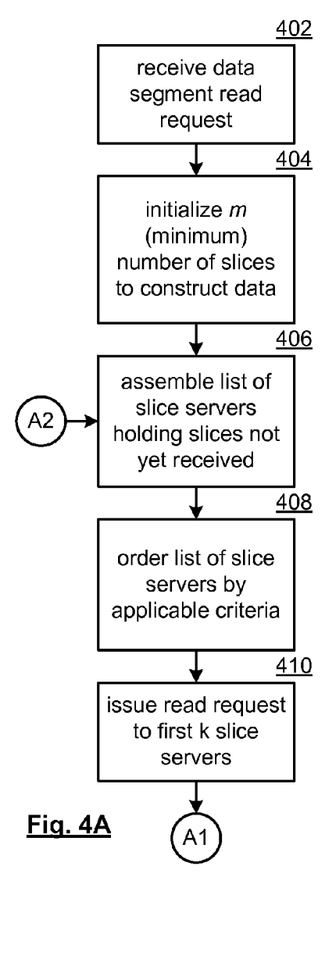
FIGS. 4A-4C collectively illustrates a read operation from a dispersed data storage grid constructed in accordance with an embodiment of the disclosed invention.
Figure 4B:
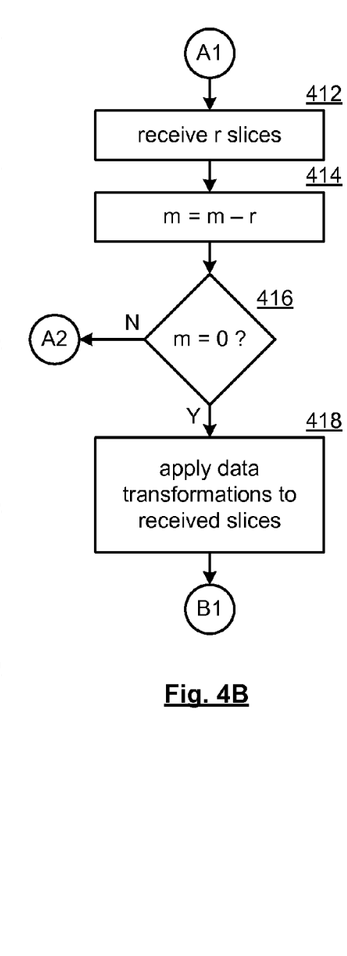
Figure 4C:
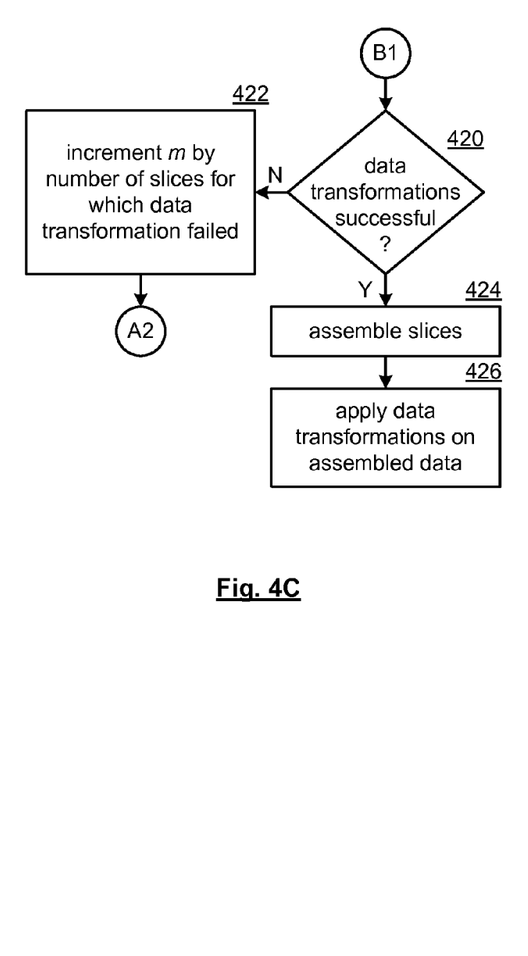

FIGS. 4A-4C show the process by which a DDSN, constructed in accordance with the disclosed invention, could fulfill a read request. In step 402, a read request is received. Contained within the read request will be information sufficient to determine which slice servers contain applicable data, as well as the minimum number of data slices that must be retrieved before the requested data can be reconstructed. Further information on one method that can be used to associate data requests with particular slice servers is contained in United States patent application titled "VIRTUALIZED DATA STORAGE VAULTS ON A DISPERSED DATA STORAGE NETWORK," filed on Oct. 9, 2007, having a Ser. No. 11/973,621, and assigned to Cleversafe, Inc. In step 404, the variable m is initialized to the minimum number of slices required to construct the requested data segment. As described herein, for each successfully received and validated slice, m is decremented.

In step 406, a list of slice servers each holding a required data slice that has yet to be received is assembled, and in step 408, the list is ordered by any applicable criteria. The applicable criteria could be an objective ranking, as depicted in FIG. 3 and discussed above, some number of user-defined policies, or some combination of objective ranking and user-defined policies. In step 410, read requests are issued to the first k slice servers on the assembled list, where k is at least equal to m, the minimum number of data slices needed to reconstruct the requested data segment, but could be as large as n, the number of data slices that have data relevant to the requested data segment. In step 412, r data slices are received, and in step 414 the number of received data slices r is subtracted from the variable m. In step 416, m is compared to zero, and if m is not equal to zero, execution returns to step 406 and proceeds as normal from there. However, if m is equal to zero, a collection of data transformations may optionally be applied to the received slices in step 418. The applied data transformations can include decryption, decompression, and integrity checking. For example, each data slice may have a cyclical redundancy check ("CRC"), or other form of checksum appended to the data contained in the slice. This checksum could be compared against a checksum calculated against the received data to ensure that the data was not corrupted while it was stored or during the transmission process.

In step 420, it is determined if the applied data transformations were successful for all of the received data slices. If the applied data transformations were not successful for some of the received slices, m is incremented by this number in step 422, and execution is resumed at step 406. The data transformations could fail, for example, if an integrity check revealed that a received data slice was corrupted. However, if the applied data transformations were successful for all received data slices, the received slices are assembled into the requested block of data in step 424. The same or different data transformations may optionally be applied to the assembled data block in step 426, which completes the read process.

Figure 5A:
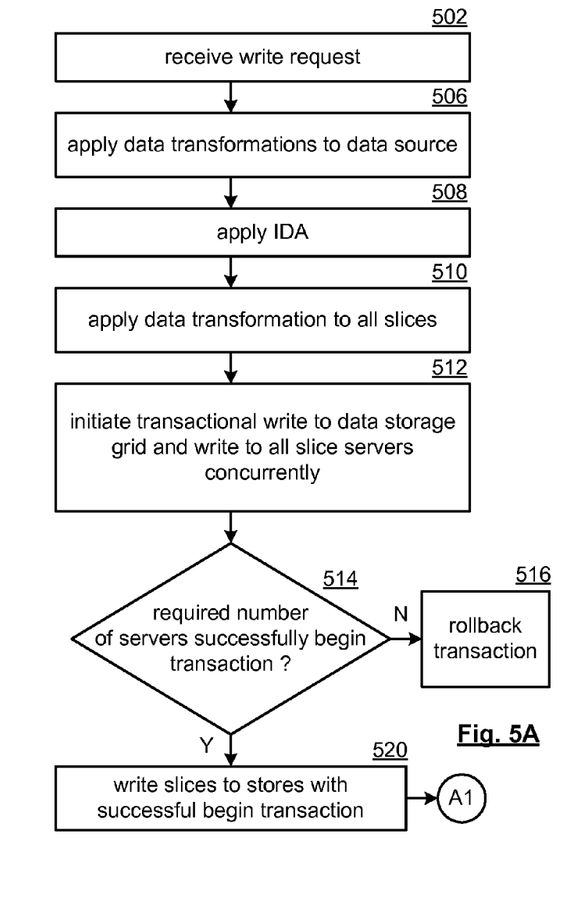
FIGS. 5A-5B collectively illustrates a write operation from a dispersed data storage grid constructed in accordance with an embodiment of the disclosed invention.
Figure 5B:
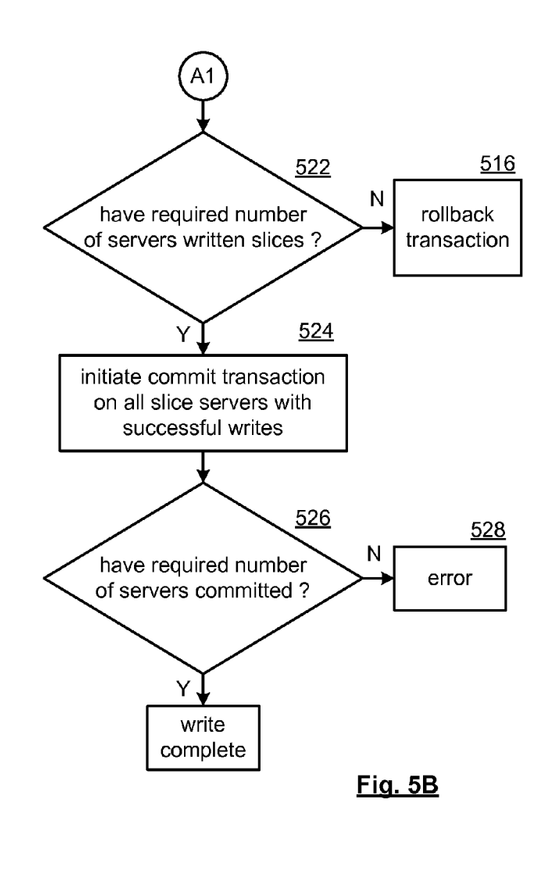

In FIGS. 5A-5B the process by which a DDSN, constructed in accordance with the disclosed invention, could write data to a network of slice servers is illustrated. In step 502 a data segment write request is received. Included in this write request is information sufficient to determine which slice servers the data segment should be written to, as well as information required by the information dispersal algorithm to divide the data segment, i.e., the number of slices to be written, referred to as n, as well as the minimum number of slices that are required to recover the data, referred to as m. Further information on one method that can be used to associate data writes with particular slice servers is contained in United States patent application titled "VIRTUALIZED DATA STORAGE VAULTS ON A DISPERSED DATA STORAGE NETWORK," filed on Oct. 9, 2007, having a Ser. No. 11/973,621, and assigned to Cleversafe, Inc.

A number of data transformations may optionally be applied to each block in step 506, and an information dispersal algorithm is applied in step 508. In particular, the Cauchy Reed-Solomon dispersal algorithm could be applied to the data segment, resulting in a predetermined number of data slices. In step 510, a number of data transformations are optionally applied to each data slice.

In the disclosed system, writes are transactional, meaning that a minimum number of data slices t must be successfully written before a write is deemed complete, and if at least t slices are not written, the write is deemed a failure, and all successfully written slices are "rolled back." Normally, the number of data slices that must be successfully written will be set to n, i.e., the number of slices that the data segment was originally divided into. However, this number can be configured by the user to a lesser number, down to the minimum number of slices required to reconstruct the data. This would allow the user to continue using the DDSN during a minor network outage where one or more slice servers were unavailable. If all slices were not successfully written, the data segment would be flagged, and, once the outage had cleared, the data segment would be rebuilt from the successfully stored slices, re-sliced, and the remaining slices stored. In step 512, a write transaction is initiated to the data storage grid. As discussed herein, all slice servers are simultaneously contacted, and in step 514, a confirmation that at least t receiving slice servers are prepared to begin the write transaction, i.e., to store each slice, must be received, or the transaction is rolled back in step 516.

In step 520 data slices are transmitted to the slice servers that indicated their ability to receive and store slices. The number of slice servers that successfully received and stored their assigned data slices is checked in step 522, and if less than t slices are successfully stored, the transaction is rolled back in step 516. In step 524, a commit transaction is initiated on all servers with successful writes. If the commit transaction fails, an error is logged in step 528. Otherwise, the write transaction was successful.

Within a DDSN, one situation bears special consideration. For a "high-redundancy" DDSN where the minimum number of data slices required to reconstruct a data segment is at most half of the number of total data slices created for each data segment, a situation may develop where multiple versions of a data segment are stored on a DDSN simultaneously. In other words, versioning issues may be a concern where the following equality is satisfied:

$$\frac{m}{n} \leq 0.5$$

For example, assume that a particular DDSN is implemented where n is set to 16 and m is set to 8. Further assume that a data segment is successfully written to all 16 slice servers. The same data segment is then written a second time with modified data, but during the second write only 8 data slices are successfully written. As the minimum number of data slices required to reconstruct the data segment have been successfully written, the write could be considered a success. However, during a read operation, the old version of the data segment could conceivably be retrieved because 8 data slices still exist with the old version.

This problem can be dealt with by adding an additional field to each stored data slice indicating not only what data segment the data slice is associated with, but also, what version of the data segment the data slice is associated with. When a read is made to a high-redundancy DDSN, at least n−m+1 data slices are read and the version field is compared across all slices. If the version fields for the data slices vary, only the data slices with the most current version are used to reconstruct the requested data segment, and if necessary, additional data slices are read as well until a sufficient number of the most current data slices are available.

Within this application, operations have been presented singularly for the sake of clarity. However, in most actual implementations, read and write operations will be conglomerated so that a plurality of read operations or a plurality of write operations will be carried out simultaneously by the DDSN. For example, a particular client computer may, at any given time, be reading or writing ten or more files. Those files may be accessing entirely different data segments, or there may be some amount of overlap in the accessed data segments. Generally, when multiple data segments are accessed simultaneously, the same principles that have been described herein for unitary accesses will apply. However, under certain circumstances, various optimizations may follow. For example, if it is determined that insufficient slice servers are available to perform a write operation, then the write process can be optimized by failing all write operations directed towards the same network of slice servers, instead of individually attempting to write each data segment.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method of reading data, said method operating on at least one computer and comprising the steps of:
   receiving a read request for a data segment stored on a dispersed data storage network;
   determining a virtual digital data storage vault to store the data segment based on the read request;
   determining a vault data structure corresponding to the virtual digital data storage vault;
   authenticating the read request in accordance with the vault data structure;
   when the read request is authenticated, assembling a list of slice servers based on the virtual digital data storage vault, wherein each slice server on said list stores at least one data slice associated with said data segment, wherein the data segment was encoded into a plurality of data slices based on an information dispersal algorithm;
   assigning a preference rating to each of said slice servers contained on said list based on at least one of a slice server's most recent response time, historical response time, and present load; and
   retrieving, based on said preference rating, a number of data slices required by the information dispersal algorithm to assemble said data segment, wherein the number of data slices is less than the plurality of data slices.

2. The method of claim 1, further comprising the step of sorting said list according to said preference rating.

3. The method of claim 1, wherein said assigning step utilizes at least a slice server's most recent response time.

4. The method of claim 1, wherein the step of assembling is accomplished in accordance with at least one user-defined policy.

5. A method of writing data, said method operating on at least one computer and comprising the steps of:
   receiving a write request to write a data segment to said dispersed data storage network;
   determining a virtual digital data storage vault that is storing the data segment based on the write request;
   determining a vault data structure corresponding to the virtual digital data storage vault;
   authenticating the write request in accordance with the vault data structure;
   when the write request is authenticated, accessing dispersal parameters of an information dispersal algorithm including a slice count indicative of a number of data slices said data segment will be divided into, and a redundancy count indicative of the number of data slices that can be lost without compromising the ability to reconstruct said data segment from said dispersed data storage network;
   performing the information dispersal algorithm on said data segment to produce a plurality of data slices equal to said slice count;
   transmitting said plurality of data slices to a plurality of slice servers that provide the virtual digital data storage vault so that each data slice is transmitted to a separate slice server; and monitoring that at least a number of data slices are successfully stored, wherein the number corresponds to the slice count less the redundancy count.

6. The method of claim 5, wherein said monitoring step requires that all of said plurality of data slices are successfully stored.

7. A computer comprising:
a network port coupled to a data network;
a central processing unit operable to process a read request by: receiving the read request regarding a data segment stored on a dispersed data storage network;
determining a virtual digital data storage vault to store the data segment based on the read request;
determining a vault data structure corresponding to the virtual digital data storage vault;
authenticating the read request in accordance with the vault data structure;
when the read request is authenticated, assembling a list of slice servers based on the virtual digital data storage vault, wherein each slice server on said list stores at least one data slice associated with a data segment, wherein the data segment was encoded into a plurality of data slices based on an information dispersal algorithm;
assigning a preference rating to each of said slice servers on said list based on at least one of a slice server's most recent response time, historical response time, and present load; and
retrieving, based on said preference rating and via the network port, a number of data slices required by the information dispersal algorithm to assemble said data segment, wherein the number of data slices is less than the plurality of data slices.

8. The computer of claim 7, wherein the central processing unit further functions to sort said list in accordance with said preference rating.

9. The computer of claim 7, wherein the central processing unit further functions to assign a preference rating to each of said slice servers on said list utilizing at least each of said slice servers' most recent ping time.

10. The computer of claim 7, wherein the central processing unit further functions to assemble a list of said slice servers having access to at least one data slice associated with said data segment in accordance with at least one user-defined policy.

11. A computer comprising:
a network port coupled to a data network;
a central processing unit for processing a write request of a data segment by:
receiving the write request to write a data segment to a dispersed data storage network;
determining a virtual digital data storage vault that is storing the data segment based on the write request;
determining a vault data structure corresponding to the virtual digital data storage vault;
authenticating the write request in accordance with the vault data structure;
when the write request is authenticated, performing an information dispersal algorithm on said data segment to produce a plurality of data slices equal to a slice count, wherein dispersal parameters of the information dispersal algorithm include the slice count and a redundancy count indicative of a number of data slices that can be lost without compromising the ability to reconstruct said data segment from said dispersed data storage network;
transmitting, via the network port, said plurality of data slices to a plurality of slice servers that provide the virtual digital storage vault so that each data slice is transmitted to a separate slice server, and
monitoring said plurality of slice servers so that at least a number of data slices are successfully stored, wherein the number corresponds to the slice count less the redundancy count.

12. The computer of claim 11, wherein the central processing unit further functions to monitor said plurality of slice servers so that all of said data slices are successfully stored.

* * * * *